United States Patent
Hansen et al.

(10) Patent No.: US 10,620,071 B2
(45) Date of Patent: Apr. 14, 2020

(54) PRESSURE SENSOR AND METHOD FOR MANUFACTURING A PRESSURE SENSOR

(71) Applicant: Danfoss A/S, Nordborg (DK)

(72) Inventors: Hans-Henning Hansen, Nordborg (DK); Ingvar Smari Kampp, Nordborg (DK); Lars Nørgaard, Nordborg (DK); Veenith Shetty, Nordborg (DK); Klaus Tonnesen, Nordborg (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 15/627,604

(22) Filed: Jun. 20, 2017

(65) Prior Publication Data
US 2018/0003580 A1    Jan. 4, 2018

(30) Foreign Application Priority Data

Jun. 29, 2016 (DK) .................................. 2016 00386

(51) Int. Cl.
*G01L 19/00* (2006.01)
*G01L 9/00* (2006.01)
*G01L 19/14* (2006.01)

(52) U.S. Cl.
CPC .......... *G01L 9/0042* (2013.01); *G01L 9/0041* (2013.01); *G01L 19/0023* (2013.01);
(Continued)

(58) Field of Classification Search
CPC . G01L 9/0042; G01L 9/0041; G01L 19/0023; G01L 19/0038; G01L 19/0046; G01L 19/142

See application file for complete search history.

(56) References Cited

U.S. PATENT DOCUMENTS

| | | | | |
|---|---|---|---|---|
| 4,369,659 A | * | 1/1983 | Wareham | G01L 19/0046 338/4 |
| 4,502,335 A | * | 3/1985 | Wamstad | G01L 19/0038 338/4 |

(Continued)

FOREIGN PATENT DOCUMENTS

| | | |
|---|---|---|
| CN | 2566253 Y | 8/2003 |
| CN | 1664527 A | 9/2005 |

(Continued)

OTHER PUBLICATIONS

Machine translation of DE 102012204950 (Year: 2013).*

*Primary Examiner* — David J Bolduc
(74) *Attorney, Agent, or Firm* — McCormick, Paulding & Huber PLLC

(57) ABSTRACT

The invention relates to a pressure sensor (1) comprising a pressure sensing arrangement (8) and a housing. The housing comprises an intermediate member (2) and a bottom part (3), wherein the intermediate member (2) comprises an aperture (4). The aperture (4) extends through the intermediate member (2), wherein the aperture (4) is on a first end (5) covered by a diaphragm (6) connected to the intermediate member (2). A second end (7) of the aperture (4) is covered by the bottom part (3) comprising the pressure sensing arrangement (8). Task of the invention is to provide a pressure sensor which allows a simplified and cost effective assembly and mounting. The task is solved in that the intermediate member (2) comprises a gripping surface (16) on an outer surface of the housing.

17 Claims, 5 Drawing Sheets

(52) U.S. Cl.
CPC ...... *G01L 19/0038* (2013.01); *G01L 19/0046* (2013.01); *G01L 19/142* (2013.01)

(56) References Cited

U.S. PATENT DOCUMENTS

| | | | |
|---|---|---|---|
| 4,576,049 A | | 3/1986 | Köhnlechner |
| 4,686,764 A | | 8/1987 | Adams et al. |
| 4,928,376 A | | 5/1990 | Poglitsch |
| 5,212,989 A | * | 5/1993 | Kodama ............ G01L 19/0038 338/4 |
| 5,307,684 A | * | 5/1994 | Moss .................. G01L 9/0051 73/706 |
| 5,315,877 A | * | 5/1994 | Park ..................... G01L 9/0075 73/718 |
| 5,595,939 A | * | 1/1997 | Otake ................ G01L 19/0038 438/51 |
| 5,744,726 A | * | 4/1998 | Maurer ............... G01L 19/0023 73/724 |
| 6,076,409 A | * | 6/2000 | Bang ................. G01L 19/0038 73/756 |
| 6,282,966 B1 | * | 9/2001 | Probst ................ G01L 19/0038 307/9.1 |
| 6,311,561 B1 | * | 11/2001 | Bang .................... G01L 9/0073 73/708 |
| 6,408,697 B1 | * | 6/2002 | Ootake .............. G01L 19/0038 73/706 |
| 7,311,007 B2 | | 12/2007 | Vogler |
| 2002/0184955 A1 | * | 12/2002 | Parker ................... G01L 9/0051 73/756 |
| 2003/0184982 A1 | * | 10/2003 | Chikuan ............. G01L 19/0084 361/752 |
| 2004/0019286 A1 | * | 1/2004 | Lia ........................ A61B 5/021 600/491 |
| 2008/0257053 A1 | * | 10/2008 | Makita ................ G01L 19/0038 73/715 |
| 2011/0303023 A1 | * | 12/2011 | Becher ................ G01L 19/0046 73/862.581 |
| 2013/0133760 A1 | * | 5/2013 | Bunner ................... G01L 13/02 137/488 |
| 2014/0260649 A1 | * | 9/2014 | Petrucelli ............. G01L 9/0055 73/726 |
| 2016/0153858 A1 | * | 6/2016 | Stott .................... G01L 9/0042 73/727 |
| 2017/0268949 A1 | * | 9/2017 | Schumacher ......... G01L 9/0002 |

FOREIGN PATENT DOCUMENTS

| | | | | |
|---|---|---|---|---|
| CN | 100390516 C | | 5/2008 | |
| CN | 102519658 A | | 6/2012 | |
| CN | 104204757 A | | 12/2014 | |
| CN | 105277311 A | | 1/2016 | |
| CN | 105452830 A | | 3/2016 | |
| CN | 105547567 A | | 5/2016 | |
| CN | 105628293 A | | 6/2016 | |
| DE | 102012204950 A1 | * | 10/2013 | ......... G01L 19/0092 |
| EP | 0 677 727 A2 | | 10/1995 | |
| EP | 1 089 063 A2 | | 4/2001 | |

* cited by examiner

PRESSURE SENSOR AND METHOD FOR MANUFACTURING A PRESSURE SENSOR

CROSS-REFERENCE TO RELATED APPLICATION

This application claims foreign priority benefits under U.S.C. § 119 to Denmark Patent Application No. PA201600386 filed on Jun. 29, 2016, the content of which is hereby incorporated by reference in its entirety.

TECHNICAL FIELD

The invention relates to a pressure sensor comprising a pressure sensing arrangement and a housing, wherein the housing comprises an intermediate member and a bottom part, wherein the intermediate member comprises an aperture extending through the intermediate member, wherein the aperture is on a first end covered by a diaphragm connected to the intermediate member, and wherein a second end of the aperture is covered by the bottom part comprising the pressure sensing arrangement. The invention further relates to a method for manufacturing such a pressure sensor.

BACKGROUND

A pressure sensor of the above kind is for example known from U.S. Pat. No. 7,311,007 B2. The disclosed pressure sensor is relatively complicated to assemble although it does not comprise any means of connecting the sensor to a sensing location like a fluid line or any means for connecting to a control unit. Consequently, the assembly and installation is relatively complicated and requires additional equipment and parts.

SUMMARY

The task of the present invention is therefore to provide a pressure sensor that allows for a simplified assembly and installation.

According to the present invention the above task is solved in a pressure sensor as mentioned in the outset in that the intermediate member comprises a structured gripping surface on an outer surface of the housing.

The gripping surface is preferably structured and arranged to be engaged by a tool to mount or unmount the pressure sensor at a sensing location like a fluid line or fluid tank. The gripping surface can be arranged on a circumferential surface of the intermediate member. The gripping surface can comprise a plurality of engagement surfaces. With this solution the assembly and installation is simplified since it is not necessary to provide an additional external means for fastening the pressure sensor like a nut.

In a preferred embodiment the gripping surface is a circumferential surface with a rotational symmetry around a rotational axis of the intermediate member. The rotational axis here refers to the axis of rotation during mounting or demounting of the pressure sensor. The rotational symmetry can for example be a 60° symmetry or a 90° symmetry.

In a preferred embodiment the intermediate member is nut-shaped, wherein the circumferential surface of the intermediate member forms the gripping surface. In this case the intermediate member has a particularly simple shape in which the aperture in the intermediate member can be arranged around the central axis of the nut.

In a further preferred embodiment the gripping surface is a polygon, in particular a polygon with a rotational symmetry around a central axis of the intermediate member. The rotational symmetry can in this case for example be a 60° or a 90° rotational symmetry. This simplifies the engagement of the gripping surface with a tool from multiple angles to mount or unmounts the pressure sensor from a sensing location.

It is preferred if the surface area of the bottom part facing the intermediate member is less than 150% of the cross sectional area of the aperture at the second end. In this case the bottom part can be relatively small compared to the intermediate member. The bottom part then mainly serves to cover the second end of the aperture, seal the electrical connections to the pressure sensing arrangement and to position the pressure sensing arrangement.

It is preferred if the pressure sensor comprises a support ring connected to the intermediate member, wherein the diaphragm is at its radially outer ends fixed to the intermediate member by the support ring.

It is preferred if the pressure sensor comprises a connector member comprising at least one electrical connector, wherein the connector member is fixed to the intermediate member at the side of the intermediate member facing the bottom part. The connector member then ensures that the pressure sensor can be easily connected to a control unit and/or to a power supply. This simplifies the installation of the pressure sensor.

In a further preferred embodiment the connector member and the intermediate member form a cavity in which the bottom part is arranged. This solution allows for a compact construction of the pressure sensor.

In a preferred embodiment the pressure sensor comprises a fluid connector for connecting the pressure sensor to a fluid conduit or a fluid tank, wherein the fluid connector is fixed to the intermediate member. The fluid connector can then comprise an inlet to guide an external fluid to the diaphragm such that the pressure of the external fluid can be transferred through the diaphragm to a fluid arranged in the aperture such that the pressure sensing arrangement can measure the pressure of the fluid in the aperture.

In a further preferred embodiment the fluid connector and the intermediate member form a fluid chamber in which the diaphragm is arranged.

Preferably, a volume reduction member is arranged in the aperture. The volume reduction member reduces the amount of pressure transmitting fluid to be filled in the aperture, which can improve the accuracy of the pressure measurements. Preferably, the volume reduction member reduces the free cross section of the aperture at the first end below the free cross section of the aperture at the second end.

The above task is furthermore solved by a method for manufacturing a pressure sensor according to any of the above embodiments, wherein the intermediate member is formed by a stamping process, wherein both the aperture and the gripping surface are formed in the stamping process. Thereby, the manufacture of the pressure sensor is simplified, costs are reduced and a pressure sensor is provided which allows for a simpler mounting and unmounting of the pressure sensor at the sensing location.

It is preferred if after the intermediate member is formed, the diaphragm is fixed to the intermediate member covering the first end and then the fluid connector is fixed to the intermediate member.

It is preferred if the aperture is filled with a pressure transmitting fluid after both the diaphragm and the bottom part have been fixed to the intermediate member.

It is preferred if the connector member is fixed to the intermediate member after the bottom part has been fixed to the intermediate member, such that the bottom part is enclosed in the cavity.

BRIEF DESCRIPTION OF THE DRAWINGS

Preferred embodiments of the invention are now described with reference to the figures, wherein.

DETAILED DESCRIPTION

Figure 1:
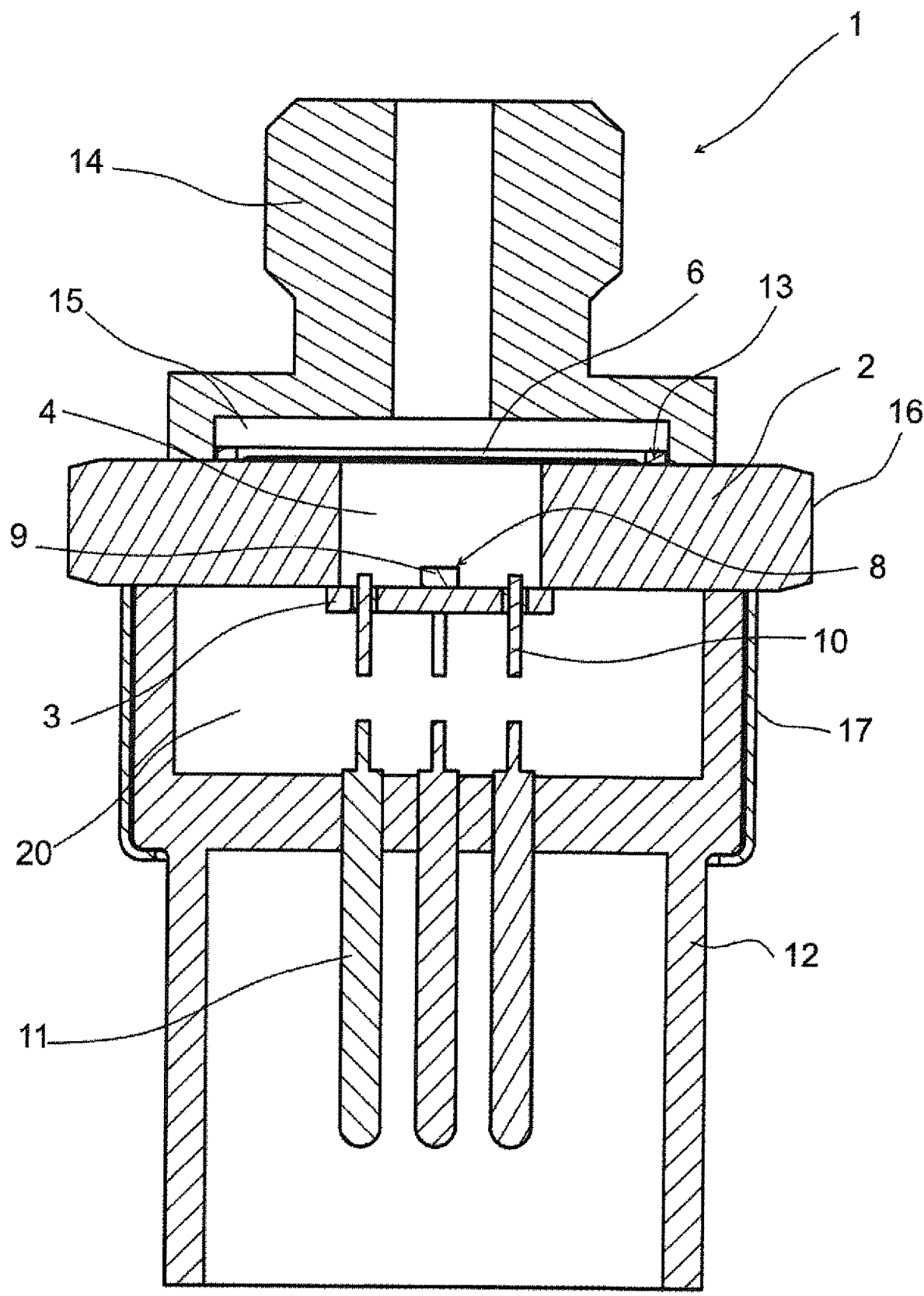
FIG. 1 shows a cut view of a first embodiment of a pressure sensor according to the invention.
Figure 2:
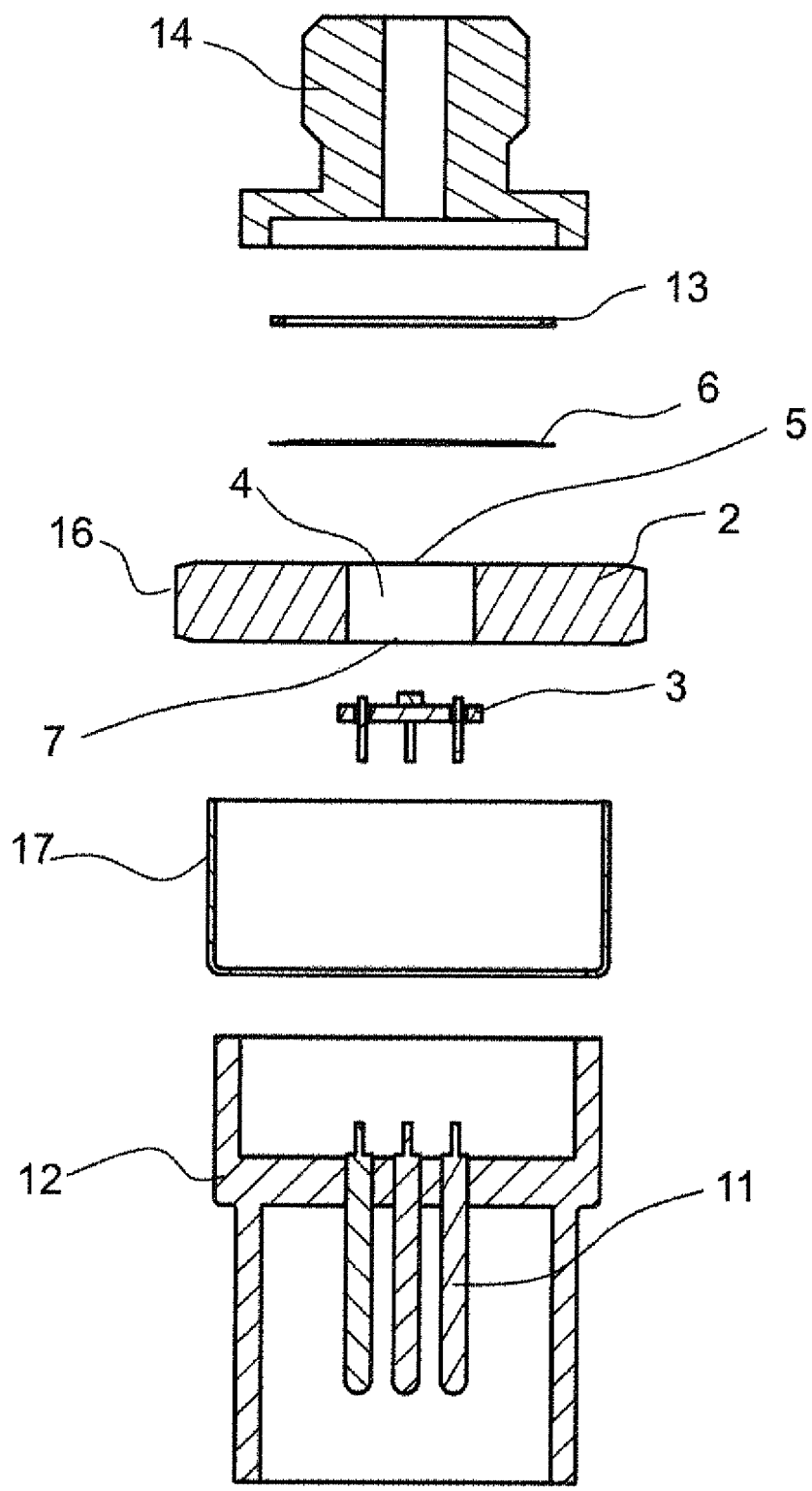
FIG. 2 shows the pressure sensor according to FIG. 1 in an exploded view.
Figure 3:
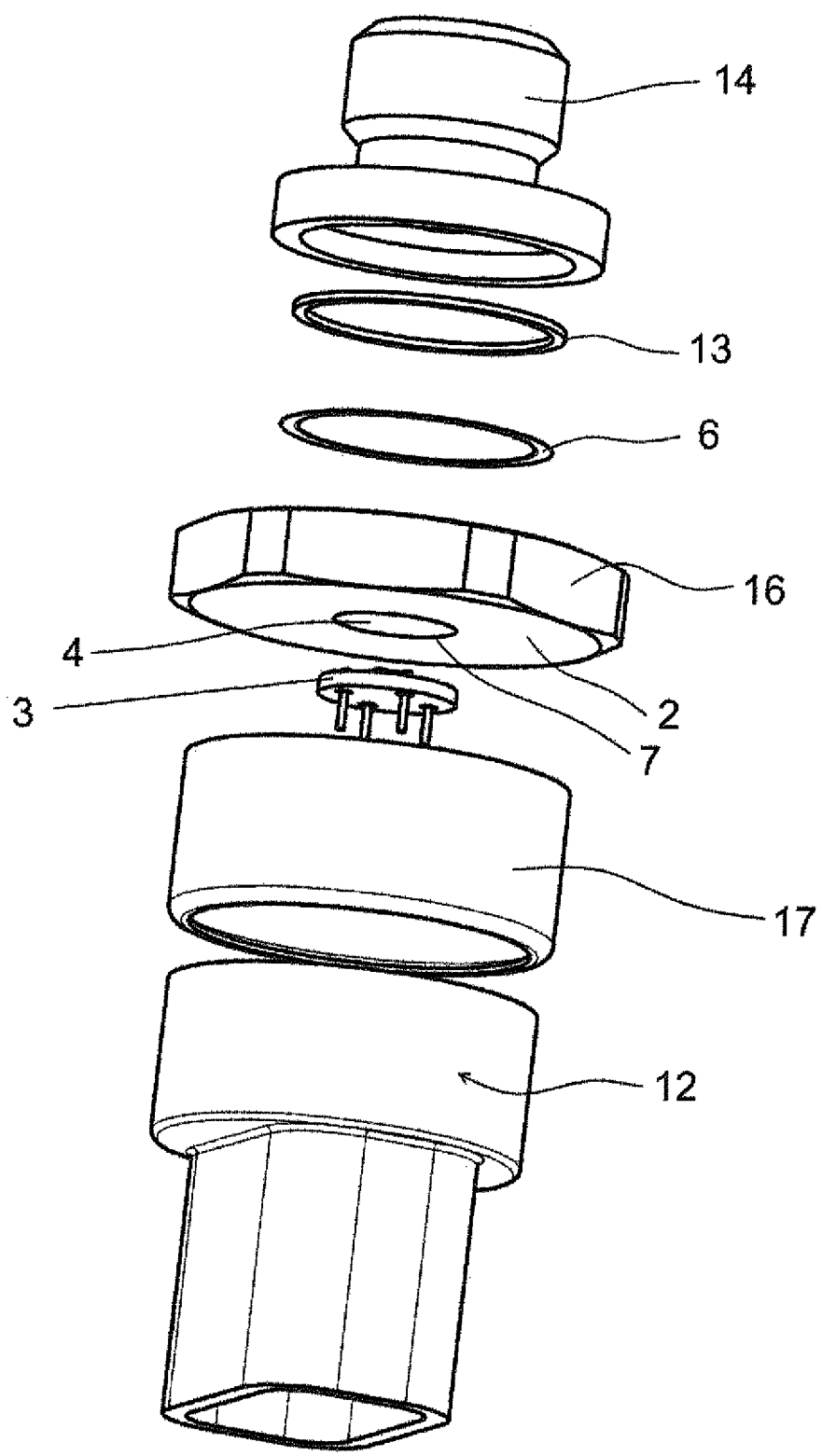
FIG. 3 shows the pressure sensor according to FIGS. 1 and 2 in an external exploded view.

FIGS. 1 to 3 show a first embodiment of a pressure sensor 1 comprising an intermediate member 2 and a bottom part 3. The intermediate member 2 comprises an aperture 4. The aperture 4 here has a cylindrical shape but other shapes like a rectangular shape are also possible. The aperture 4 is on a first end 5 covered by a diaphragm 6. A second end 7 of the aperture 4 is covered by the bottom part 3. A pressure sensing arrangement 8 is arranged in the aperture 4 comprising a semi-conductor arrangement 9. The semi-conductor arrangement 9 is preferably glued to the bottom part 3. The bottom part 3 is welded to the intermediate member 2, preferably at the radially outer ends of the bottom part 3. The surface area of the bottom part 3 facing the intermediate member 2 is less than 150% of the cross sectional area of the aperture 4 at the second end 7. Thereby, the size of the bottom part 3 can be limited to the necessary size for ensuring the function of the bottom part, mainly to place and secure the pressure sensing arrangement 8 and to provide leads 10 protruding through the bottom part 3. The leads 10 are electrically connected to the pressure sensing arrangement 8 on one end and/or furthermore electrically connected to connectors 11 arranged in a connector member 12. The electrical connections between the leads 10 and the pressure sensing arrangement 8 as well as to the connectors 11 are not shown for simplicity. The electrical connections between the leads 10 and the connectors 11 may be formed by or comprise signal conditioning electronics.

The aperture 4 arranged in the intermediate member 2 is filled with a pressure transmitting fluid to transmit the pressure to be measured to the pressure sensing arrangement 8 through the diaphragm 6. The diaphragm 6 is fixed to the intermediate member 2 by a support ring 13.

The pressure sensor 1 furthermore comprises a fluid connector 14 for connecting the pressure sensor 1 to a fluid tank or fluid conduit in which the pressure should be measured. The fluid connector 14 is fixed to the intermediate member 2 whereby a fluid chamber 15 is formed. The diaphragm 6 is arranged in the fluid chamber 15. The fluid coming from the external fluid tank or fluid conduit to which the pressure sensor 1 is connected can flow to the fluid chamber 15 and comes in contact with the diaphragm 6. The pressure of the fluid in the fluid chamber 15 is thereby passed through the diaphragm 6 to the aperture 4 and the fluid arranged therein. The fluid arranged in the aperture 4 is preferably an oil. The fluid can be filled into the aperture 4 after the diaphragm 6 and the bottom part 3 have been fixed to the intermediate member 2. To this end the housing of the pressure sensor 1 can comprise a filler opening (not shown) for filling the pressure transmitting fluid into the aperture 4. The filler opening can then preferably be closed by a metal ball. Preferably, the filler opening is arranged in the intermediate member 2 or in the bottom part 3.

The intermediate member 2 can be formed by a stamping process such that the aperture 4, and/or a filler hole and/or a gripping surface 16 can be formed in a single stamping process. The gripping surface 16 is arranged on a radially outer surface of the intermediate member 2. The gripping surface 16 can be a polygon, preferably with a rotational symmetry of 60 or 90°. The intermediate member 2 preferably is nut-shaped. The gripping surface 16 simplifies the mounting and unmounting of the pressure sensor 1.

Preferably, the pressure sensor 1 comprises a capsule 17 to connect the connector member 12 to the intermediate member 2. The capsule 17 can be welded to the intermediate member 2. The capsule 17 and the intermediate member 2 as well as the fluid connector 14 can be made from a metal. Consequently, the fluid connector 14 can also be welded to the intermediate member 2. The connector member 12 however is preferably made from an electrically insulating material through which the electrical connectors 11 are let into the housing of the pressure sensor 1.

Figure 4:
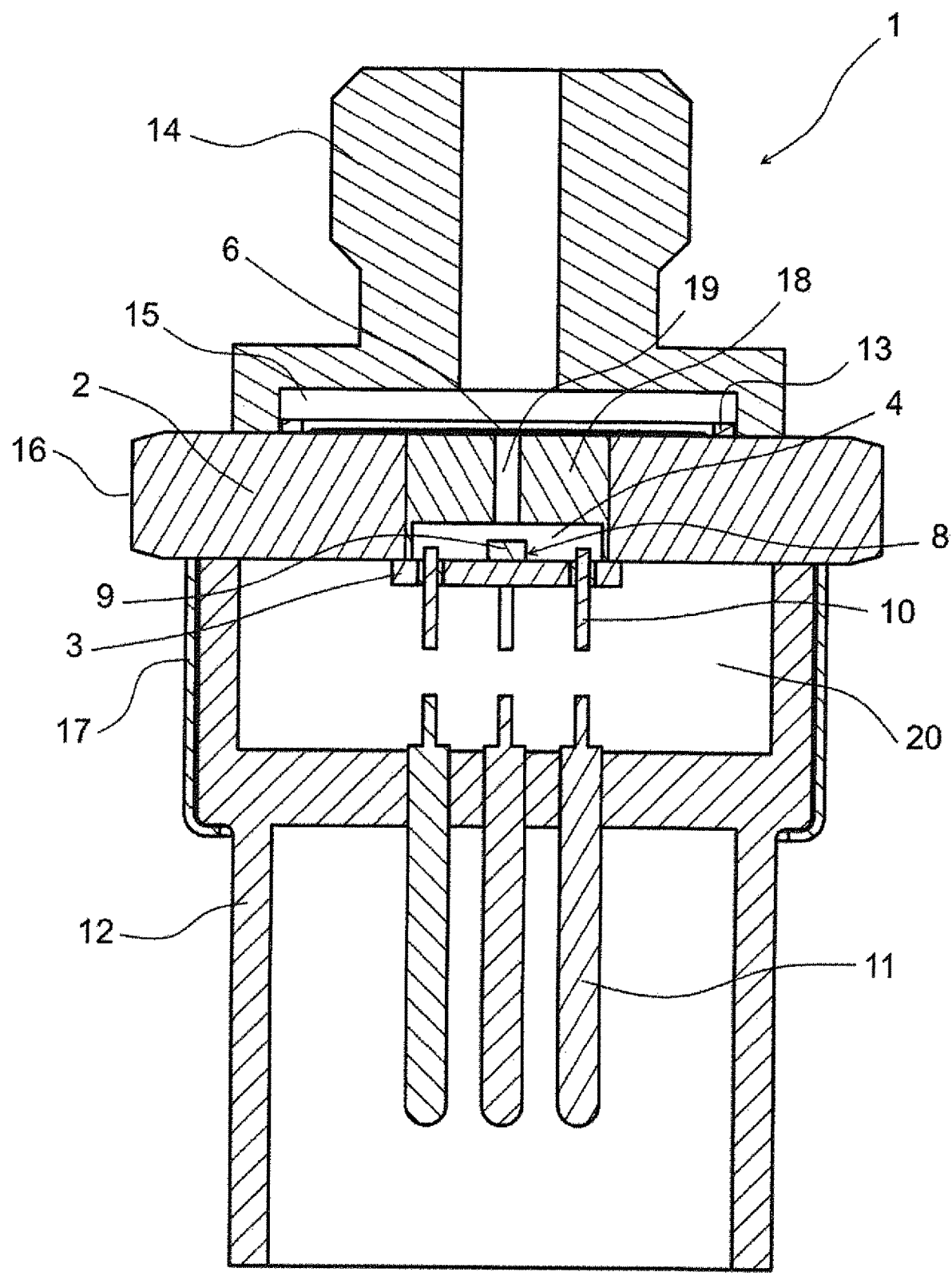
FIG. 4 shows a second embodiment of a pressure sensor according to the invention in a cut view.
Figure 5:
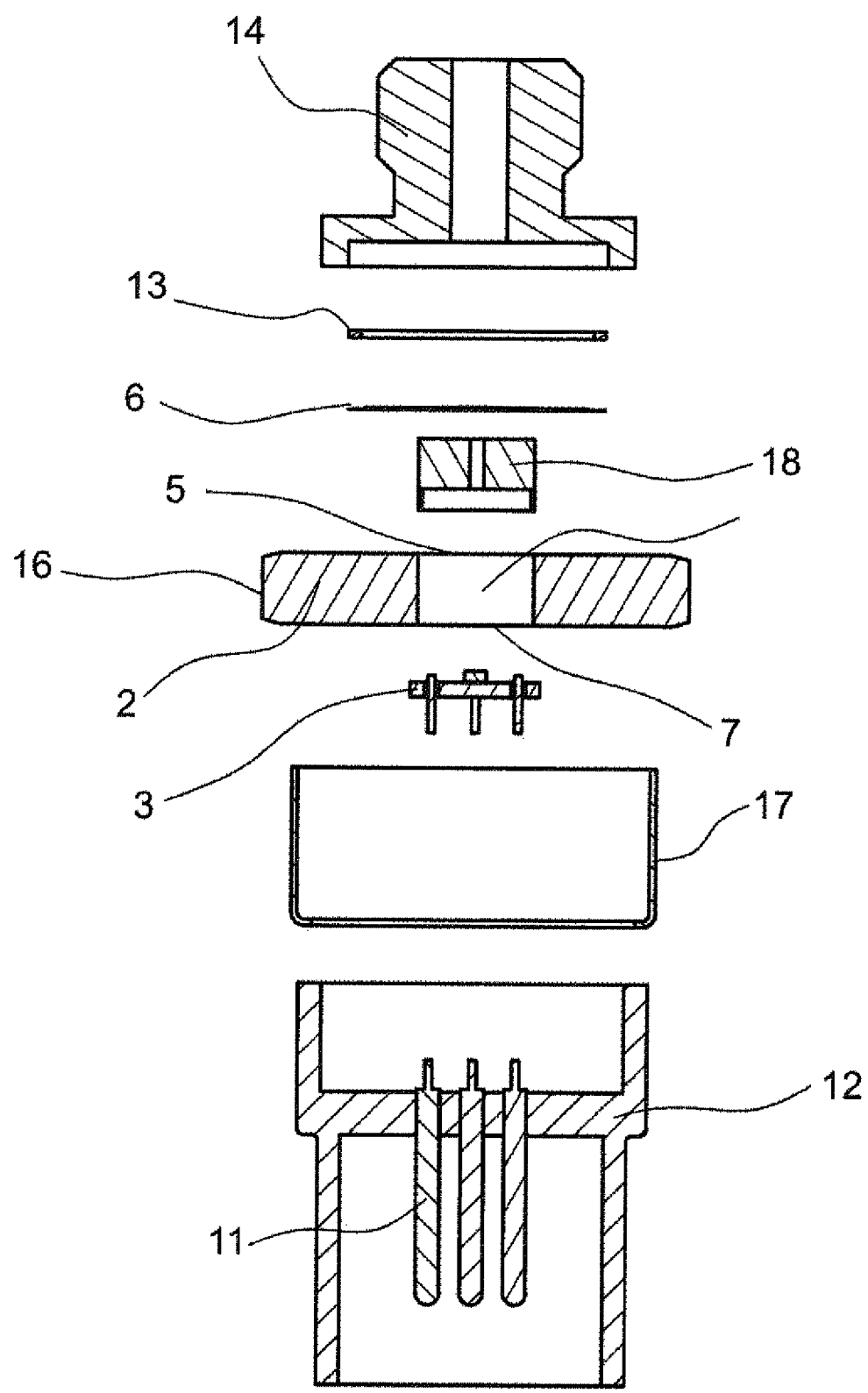
FIG. 5 shows the pressure sensor according to FIG. 4 in an exploded view.

FIGS. 4 and 5 show a second embodiment of a pressure sensor 1 according to the invention. This second embodiment is identical to the first embodiment except for an additional volume reduction member 18 that is arranged in the aperture 4. The volume reduction member 18 reduces the volume of pressure transmitting fluid arranged in the aperture 4. Thereby the accuracy of the pressure measurement of the pressure sensor 1 can be increased. The volume reduction member 18 preferably is made from a ceramic material. The volume reduction member 18 preferably reduces the free cross section at the first end 5 of the aperture 4 below the free cross section of the aperture 4 at the second end 7. Thereby the influence of volumetric expansion of the fluid arranged in the aperture 4 can be reduced. The volume reduction member 18 to this end comprises a channel 19 which transmits the pressure from the diaphragm 6 to the pressure sensing arrangement 8.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A pressure sensor comprising a pressure sensing arrangement and a housing, wherein the housing comprises an intermediate member and a bottom part, wherein the intermediate member comprises an aperture extending through the intermediate member, the aperture formed concentrically with a central axis of the intermediate member, wherein the aperture is on a first end covered by a diaphragm connected to the intermediate member, wherein a second end of the aperture is covered by the bottom part comprising the pressure sensing arrangement, wherein the intermediate member comprises a gripping surface on an outer surface of the housing, and wherein the surface area of the bottom part facing the intermediate member is less than 150% of the cross sectional area of the aperture at the second end.

2. The pressure sensor according to claim 1, wherein the gripping surface is a circumferential surface with a rotational symmetry around a rotational axis of the intermediate member.

3. The pressure sensor according to claim 1, wherein the intermediate member is nut-shaped, wherein the circumferential surface of the intermediate member forms the gripping surface.

4. The pressure sensor according to claim 3, wherein the gripping surface is a polygon, in particular a polygon with a rotational symmetry around the central axis of the intermediate member.

5. The pressure sensor according to claim 1, wherein the pressure sensor comprises a support ring connected to the intermediate member, whereby the diaphragm is at its radially outer ends fixed to the intermediate member by the support ring.

6. The pressure sensor according to claim 1, wherein the pressure sensor comprises a connector member comprising at least one connector, wherein the connector member is fixed to the intermediate member at the side of the intermediate member facing the bottom part.

7. The pressure sensor according to claim 6, wherein the connector member and the intermediate member form a cavity in which the bottom part is arranged.

8. The pressure sensor according to claim 1, wherein the pressure sensor comprises a fluid connector for connecting the pressure sensor to a fluid conduit or a fluid tank, wherein the fluid connector is fixed to the intermediate member.

9. The pressure sensor according to claim 8, wherein the fluid connector and the intermediate member form a fluid chamber in which the diaphragm is arranged.

10. The pressure sensor according to claim 1, wherein a volume reduction member is arranged in the aperture.

11. A method for manufacturing a pressure sensor according to claim 1, wherein the intermediate member is formed by a stamping process, and wherein both the aperture and the gripping surface are formed in the stamping process.

12. The method according to claim 11, wherein after the intermediate member is formed, the diaphragm is fixed to the intermediate member covering the first end and then the fluid connector is fixed to the intermediate member.

13. The method according to claim 12, wherein the aperture is filled with a pressure transmitting fluid after both the diaphragm and the bottom part have been fixed to the intermediate member.

14. The method according to claim 13, wherein the connector member is fixed to the intermediate member after the bottom part has been fixed to the intermediate member, such that the bottom part is enclosed in the cavity.

15. The pressure sensor according to claim 2, wherein the intermediate member is nut-shaped, wherein the circumferential surface of the intermediate member forms the gripping surface.

16. The pressure sensor according to claim 2, wherein the pressure sensor comprises a support ring connected to the intermediate member, whereby the diaphragm is at its radially outer ends fixed to the intermediate member by the support ring.

17. A pressure sensor comprising a pressure sensing arrangement and a housing, wherein the housing comprises an intermediate member and a bottom part, wherein the intermediate member comprises an aperture extending through the intermediate member, wherein the aperture is on a first end covered by a diaphragm connected to the intermediate member, wherein a second end of the aperture is covered by the bottom part comprising the pressure sensing arrangement, wherein the intermediate member comprises a gripping surface on an outer surface of the housing, and wherein the surface area of the bottom part facing the intermediate member is less than 150% of the cross sectional area of the aperture at the second end.

* * * * *